US007706155B1

(12) United States Patent
Bell et al.

(10) Patent No.: US 7,706,155 B1
(45) Date of Patent: Apr. 27, 2010

(54) CURRENT MODE HALF-BRIDGE POWER CONVERTER

(75) Inventors: Robert Bell, Chandler, AZ (US); Steven Joseph Schulte, Scottsdale, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 446 days.

(21) Appl. No.: 11/851,263

(22) Filed: Sep. 6, 2007

(51) Int. Cl.
*H02M 3/335* (2006.01)

(52) U.S. Cl. .............................. 363/17; 363/18; 363/20; 363/21.05

(58) Field of Classification Search ................... 363/16, 363/19, 17, 18, 20, 21.04, 21.05, 21.09, 55, 363/56.01, 95, 56.02, 58, 98, 132
See application file for complete search history.

(56) References Cited

U.S. PATENT DOCUMENTS

| | | | | |
|---|---|---|---|---|
| 4,631,653 | A | 12/1986 | Small | |
| 6,188,586 | B1 * | 2/2001 | Farrington et al. | 363/17 |
| 6,396,716 | B1 | 5/2002 | Liu et al. | |
| 7,196,916 | B2 | 3/2007 | Batarseh et al. | |
| 2003/0021128 | A1 * | 1/2003 | Brkovic | 363/17 |
| 2005/0207183 | A1 * | 9/2005 | Chang | 363/17 |

OTHER PUBLICATIONS

Luin Kuo, Sun "Half-Bridge Transistor Inverter for DC Power Conversion," IEEE Transactions on Industrial Electronics and Control Instrumentation, vol. IECI-21, Issue 4, Nov. 1974, 249-253.

Ghosh, Rajesh et al., "A Simple Analog Controller for Single-Phase Half-Bridge Rectifier," IEEE Transactions on Power Electronics, vol. 22, Issue 1, Jan. 2007, 186-198.

Lo, Yu-Kang et al., "Analysis and Elimination of Voltage Imbalance Between the Split Capacitors in Half-Bridge Boost Rectifiers," IEEE Transactions on Industrial Electronics, vol. 49, No. 5, Oct. 2002, 1175-1177.

Lin, Bor-Ren et al., "Half-Bridge Neutral Point Diode Clamped Rectifier for Power Factor Correction," IEEE Transactions on Aerospace and Electronic Systems, vol. 38, No. 4, Oct. 2002, 1287-1294.

Adair, Roger "Design Review: A 300W, 300KHz Current-Mode Half-Bridge Converter with Multiple Outputs Using Coupled Inductors," Unitrode Corporation, Lexington, MA, Topic 6, 7 pgs.

LM5035 PWM Controller with Integrated Half-Bridge and SyncFET Drivers, National Semiconductor Corporation, Sep. 2006, 27 pgs.

* cited by examiner

*Primary Examiner*—Bao Q Vu
*Assistant Examiner*—Nguyen Tran
(74) *Attorney, Agent, or Firm*—Darby & Darby PC; Matthew M. Gaffney

(57) ABSTRACT

The invention relates to a half-bridge power converter controller that employs current mode control. The power converter controller includes pulse modulation circuitry, error circuitry, and stabilization circuitry. The stabilization circuitry stabilizes the voltage at the mid-point of a half-bridge power converter input capacitor circuit. The input capacitor circuit mid-point voltage is stabilized by selectively adjusting the on-times of the high-side switch and low-side switch of a half-bridge power converter. This adjustment tailors the current that is provided to the input capacitor circuit and thus maintains the mid-point voltage near a desired value.

20 Claims, 9 Drawing Sheets

CURRENT MODE HALF-BRIDGE POWER CONVERTER

TECHNICAL FIELD

The invention is generally directed to the area of power conversion. The invention is directed, particularly, but not exclusively to the current mode control of half-bridge power converters.

BACKGROUND

Power converters and power converter controllers may employ either voltage mode control or current mode control. Voltage mode control can be implemented through simple circuit topologies and provides good noise immunity. Voltage mode control generally entails a second order system. Current mode control generally entails more complex circuit topology. However, current mode control typically directly senses the current through an output inductor. Thus, current mode control can provide faster response to changes in output current.

Half-bridge power converters may be employed to provide efficient power conversion. In particular, half-bridge power converters are suited for efficiently powering loads which require substantial current. However, input capacitor stabilization considerations complicate the implementation of current mode half-bridge power converters.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Figure 1:
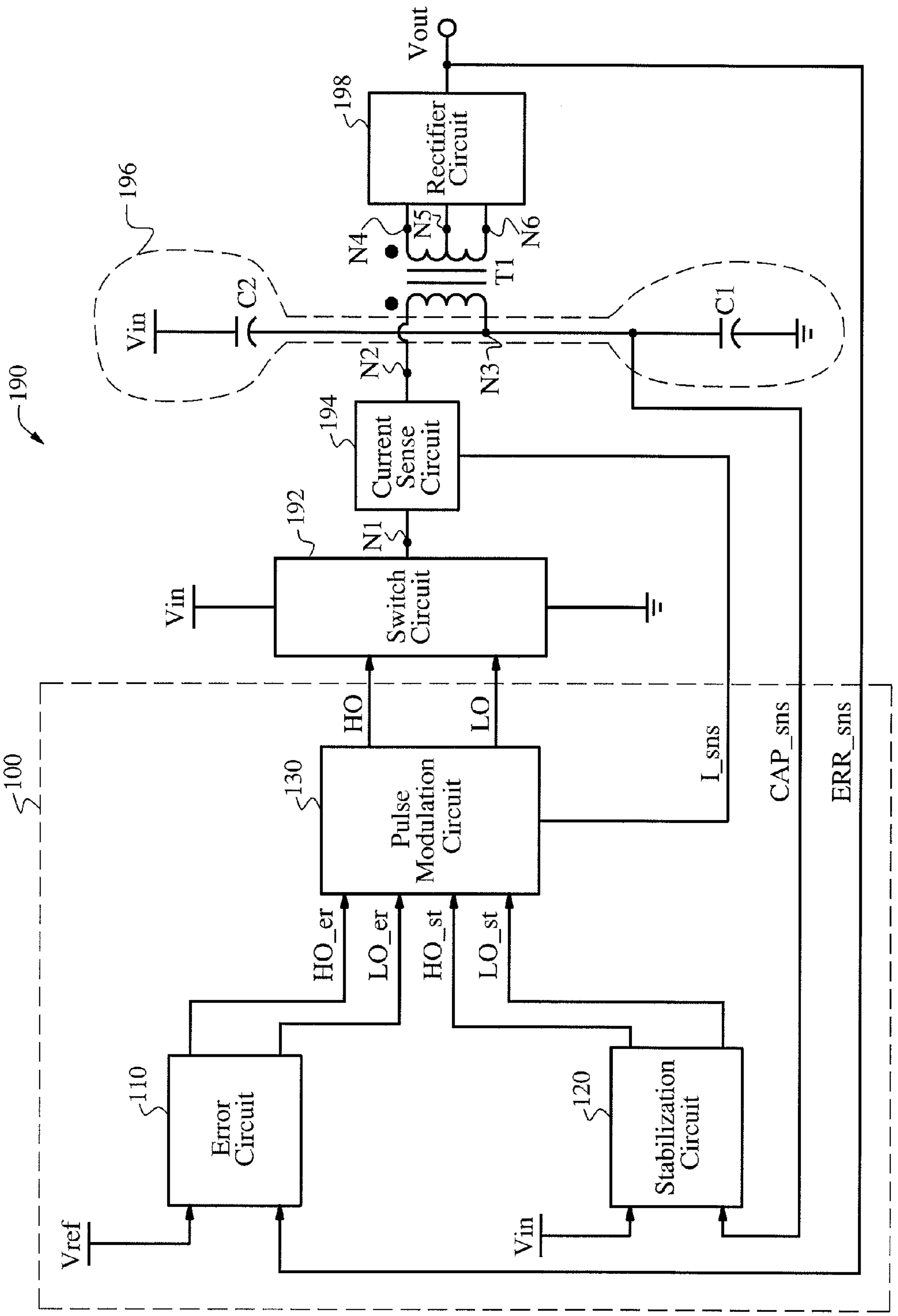
FIG. 1 is a block diagram of an embodiment of a power converter according to aspects of the present invention.

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part, on" and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. Where either a field effect transistor (FET) or a bipolar transistor may be employed as an embodiment of a transistor, the scope of the words "gate", "drain", and "source" includes "base", "collector", and "emitter", respectively, and vice versa. The phrase "in one embodiment," as used herein does not necessarily refer to the same embodiment, although it may.

Briefly stated, the invention relates to a half-bridge power converter controller that employs current mode control. The power converter controller includes pulse modulation circuitry, error circuitry, and stabilization circuitry. The stabilization circuitry stabilizes the voltage at the mid- point of a half-bridge power converter input capacitor circuit. The input capacitor circuit mid-point voltage is stabilized by selectively adjusting the on-times of the high-side switch and low-side switch of a half-bridge power converter. This adjustment tailors the current that is provided to the input capacitor circuit and thus maintains the mid-point voltage near a desired value.

FIG. 1 is a block diagram of an embodiment of power converter 190. Power converter 190 includes switch circuit 192, current sense circuit 194, input capacitor circuit 196, transformer T1, rectifier circuit 198, and power converter controller 100. Power converter 190 is arranged as a current mode half-bridge power converter. In one embodiment, power converter 190 is arranged to provide a substantially stable output voltage Vout from input voltage Vin.

Switch circuit 192 is arranged to selectively couple voltage supply Vin or ground to node N1 under the control of switch control signals HO and LO. For example, node N1 may be coupled to voltage supply Vin while switch control signal HO is asserted, and node N1 may be coupled to ground while switch control signal LO is asserted. In other embodiments, switch circuit 192 may be arranged to selectively provide other voltages to node N1. For example, these other voltage supplies may provide positive or negative voltages.

Current sense circuit 194 is arranged to provide current sense signal I_sns to power converter controller 100. In one embodiment, current sense circuit 194 is arranged to provide current sense signal I_sns based, at least in part, on an output current of switch circuit 192. Current sense circuit 194 may include a current sense resistor, a current sense amplifier, filtering circuitry, and/or the like. In one embodiment, current sense circuit 194 also provides a relatively low impedance path between nodes N1 and N2. In another embodiment, nodes N1 and N2 are, in fact, a single node.

Input capacitor circuit 196 includes capacitors C1 and C2 and is arranged to provide a voltage of approximately ½Vin to the primary coil of transformer T1 at node N3. In addition, capacitor sense signal CAP_sns is provided to power converter controller 100 based, at least in part, on the capacitor circuit mid-point voltage at node N3. In one embodiment, input capacitor circuit 196 provides a bias such that the magnitude of voltage across the primary coil of transformer T1 is approximately equal to ½Vin when switch circuit 192 initially couples either Vin or ground to node N1. Capacitors C1 and C2 may be of any types or values that are suitable for power converters.

Transformer T1 may be any transformer that is suitable for half-bridge power conversion. In one embodiment, transformer T1 is arranged to provide power to rectifier circuit 198 based, at least in part, on the changing current through the primary coil of transformer T1.

Rectifier circuit 198 is arranged to rectify the output of transformer T1 to provide output voltage Vout. In one embodiment, error sense signal ERR_sns is also provided by rectifier circuit 198 based, at least in part, on the value of output voltage Vout. Error signal ERR_sns may be provided directly from output voltage Vout, via a buffer, via a voltage follower, via a voltage divider, and/or the like, and combinations thereof.

Power converter controller 100 is arranged to control the conversion of input voltage Vin to output voltage Vout and includes error circuit 110, stabilization circuit 120, and pulse modulation circuit 130. Power converter controller 100 is further arranged to receive current sense signal I_sns, capacitor sense signal CAP_sns, and error sense signal ERR_sns and to provide switch control signals HO and LO to control power conversion and to maintain a mid-point voltage at node N3.

Error circuit 110 is arranged to receive error sense signal ERR_sns and reference voltage Vref. Error circuit 110 is further arranged to provide error signals HO_er and LO_er based, at least in part, on a difference between error sense signal ERR_sns and reference voltage Vref. Reference voltage Vref may be of any suitable value and may be provided by an external reference source or may be internally generated. For example, band-gap reference circuits, Zener diodes, digital-to-analog converters, and/or the like, may be suitably employed. In one embodiment, reference voltage Vref is provided by an internal band-gap circuit.

Stabilization circuit 120 is arranged to stabilize the mid-point voltage at node N3 of input capacitor circuit 196. In one embodiment, stabilization circuit 120 is arranged to receive capacitor sense signal CAP_sns and input voltage Vin and to provide stabilization signals HO_st and LO_st. For example, stabilization signals HO_st and LO_st may be provided based, at least in part, on a difference between capacitor sense signal CAP_sns and a predetermined value. For example, the predetermined value may be related to input voltage Vin. In one embodiment, the predetermined value is approximately equal to ½Vin.

Pulse modulation circuit 130 is arranged to provide switch control signals HO and LO to control the switching of switch circuit 192. Switch control signals HO and LO are provided based, at least in part, on current sense signal I_sns, error signals HO_er and LO_er, and stabilization signals HO_st, and LO_st. Pulse modulation circuit 130 may perform pulse width modulation (PWM), pulse frequency modulation (PFM), and/or the like. In addition, pulse modulation circuit 130 may include PWM logic circuitry, PFM logic circuitry, pulse modulation comparators, clock sources, and/or the like, and combinations thereof.

Figure 2:
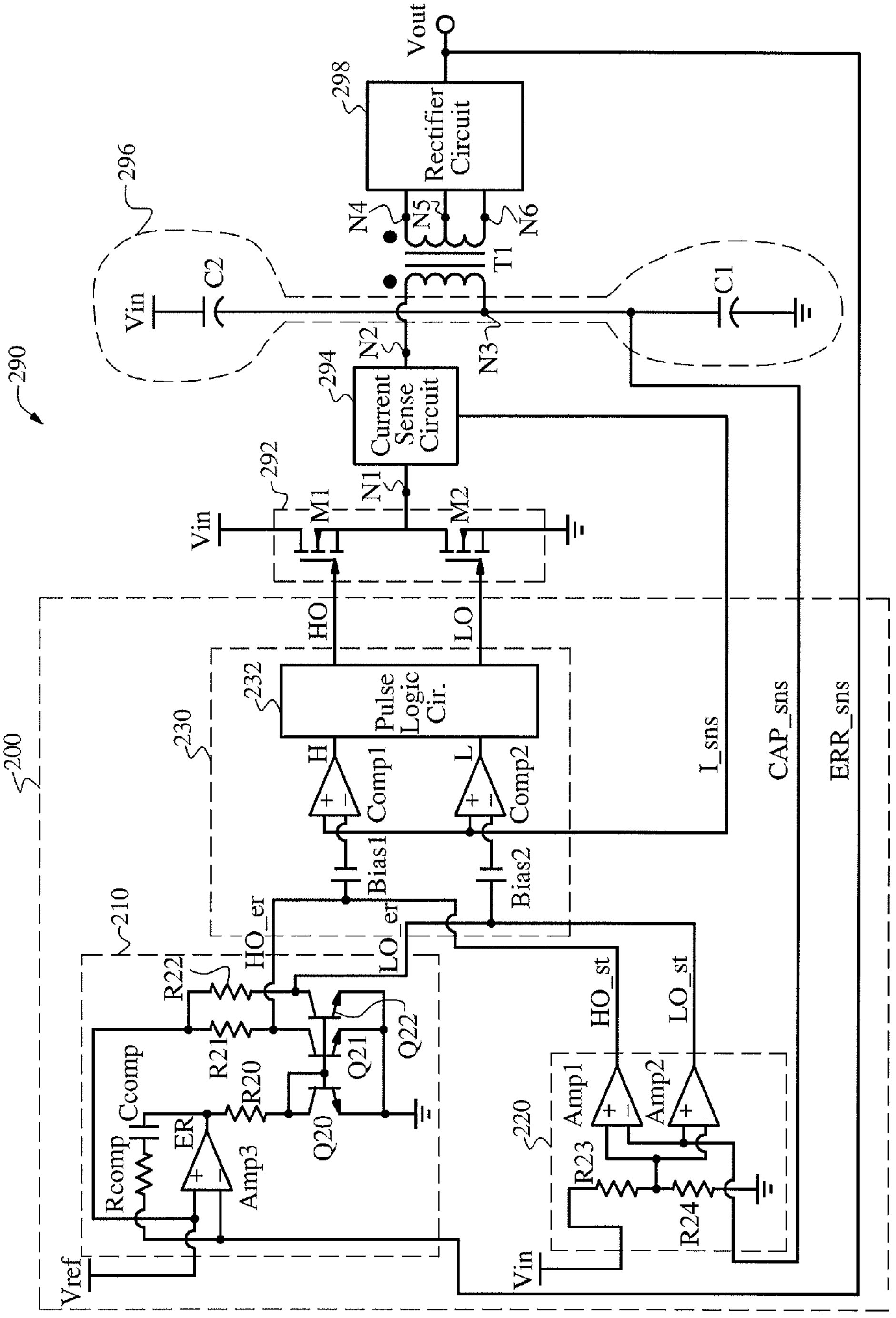
FIG. 2 is a schematic diagram of an embodiment of the power converter of FIG. 1 according to aspects of the present invention.

FIG. 2 is a schematic diagram of an embodiment of power converter 290. Power converter 290 may be employed as an embodiment of power converter 190 of FIG. 1.

In one embodiment, switch circuit 292 includes N-channel MOSFET switching devices M1 and M2. However, in other embodiments, P-channel MOSFET devices, BJT transistors, JFET transistors, relays, other electronically controlled switching devices, and/or the like, may be suitably employed. These variations are within the spirit and scope of the invention. Switch circuit 292 is also arranged to selectively couple voltage supply Vin or ground to node N1 under the control of switch control signals HO and LO.

Error circuit 210 of power converter controller 200 includes error amplifier AMP3, resistors Rcomp and R20-R22, capacitor Ccomp, and transistors Q20-Q22. In one embodiment, error amplifier AMP3, resistor Rcomp, and capacitor Ccomp are arranged to provide error signal ER based, at least in part, on a difference between error signal ERR_sns and reference voltage Vref. Likewise, transistors Q20-Q22 are arranged as a current mirror circuit to provide error signals HO_er and LO_er based, at least in part, on error signal ER. For example, the sizing and ratio of transistors Q20-Q22 and the values of resistors R20-R22 may be selected such that the error signals HO_er and LO_er are provided based on the value of error signal ER. Any suitable sizing, ratio, and/or values for transistors Q20-Q22 and resistors R20-R22 may be selected.

In one embodiment, error signals HO_er and LO_er are provided as separate error signals such that stabilization signal HO_st may be summed with error signal HO_er without substantially affecting error signal LO_er. Likewise, stabilization signal LO_st may be summed with error signal LO_er without substantially affecting error signal HO_er.

Stabilization circuit 220 includes voltage divider resistors R23 and R24 and amplifiers AMP1 and AMP2. In one embodiment, voltage divider resistors R23 and R24 are arranged as a voltage divider to provide a predetermined voltage to the non-inverting input of amplifier AMP1 and to the inverting input of amplifier AMP2. For example, the values of resistors R23 and R24 may be selected such that the predetermined voltage is related to a desired voltage of mid-point node N3 of input capacitor circuit 296. In one embodiment, this predetermined voltage is approximately equal to ½Vin. However, in other embodiments, other predetermined voltages may be selected.

In the illustrated embodiment, capacitor sense signal CAP_sns is provided to the inverting input of amplifier AMP1 and to the non-inverting input of amplifier AMP2. However, in other embodiments, capacitor sense signal CAP_sns may be provided to amplifiers AMP1 and AMP2 via a voltage divider or other circuitry.

In one embodiment, stabilization circuit 220 is arranged to provide stabilization signals HO_st and LO_st such that they are proportional to the difference between the predetermined voltage and capacitor sense signal CAP_sns. For example, amplifier AMP1 may be arranged such that stabilization signal HO_st is positive when capacitor sense signal CAP_sns is less than the predetermined voltage and is negative when capacitor sense signal CAP_sns is greater than the predetermined voltage. Likewise, amplifier AMP2 may be arranged such that stabilization signal LO_st is positive when capacitor sense signal CAP_sns is greater than the predetermined voltage and is negative when capacitor sense signal CAP_sns is less than the predetermined voltage.

In one embodiment, amplifiers AMP1 and AMP2 are sink-only transconductance amplifiers. For example, in this embodiment, stabilization circuit 220 may be arranged to sink current away from error signals HO_er and LO_er based, at least in part, on the difference between the mid-point voltage at node N3 and a predetermined voltage that is substantially equal to ½Vin. In this way, stabilization circuit 220 functions to modify the output of comparison circuits AMP3 and AMP4 and to adjust the lengths of the pulses provided on switch control signals HO and LO. In this way, switch control signals HO and LO are provided such that the mid-point voltage at node N3 is maintained substantially at ½Vin.

Pulse modulation circuit 230 includes bias sources BIAS1 and BIAS2, comparison circuits COMP1 and COMP2, and pulse logic circuit 232. In one embodiment, pulse modulation circuit 232 is arranged to provide switch control signals HO and LO to switch circuit 292.

In one embodiment, bias sources BIAS1 and BIAS2 are arranged to provide bias voltages and/or offset voltages to the respective inverting inputs of comparison circuits COMP1 and COMP2. In one embodiment, bias sources BIAS1 and BIAS2 are voltage sources that provide a fixed voltage across its terminals. For example, they may be employed to compensate for an offset voltage that is generated by transistors Q21-Q22 of error circuit 210. In one embodiment, bias sources BIAS1 and BIAS2 are arranged to provide an offset voltage of approximately 1.4 volts. In other embodiments, bias sources BIAS1 and BIAS2 may provide differing amounts of offset or may be omitted.

Comparison circuits COMP1 and COMP2 are arranged to provide comparison signals H and L to pulse logic circuit 232. Comparison circuits COMP1 and COMP2 may be PWM comparators, other comparators, differential amplifiers, operational amplifiers, and/or the like. Also, comparison circuits COMP1 and COMP2 may provide hysteresis.

In one embodiment, pulse logic circuit 232 is arranged to provide switch control signals HO and LO based, at least in part, on comparison signals H and L. Pulse logic circuitry is discussed in further detail below, for one embodiment.

In other embodiments, embodiments of power converters and/or power converter controllers may differ from the embodiments of FIGS. 1 and 2. For example, current sense signal I_sns, capacitor sense signal CAP_sns, and error sense signal ERR sns may be sensed from different nodes, through other sensing circuitry, voltage dividers, and/or the like. In addition, other embodiments of power converter controllers may be arranged such that stabilization signals HO_st and LO_st are employed to otherwise modify the timing of switch control signals HO and LO. For example, instead of being summed with error signals HO_er and LO_er, stabilization signals HO_st and LO_st may be summed with, offset, adjust, and/or the like, current sense signals, error sense signals, switch control signals, and/or the like. In yet another embodiment, current sense signal I_sns, capacitor sense signal CAP_sns, and error sense signal ERR_sns may be may be digitized by analog-to-digital converters, and the comparisons, summing, adjustments, offsets and/or the like, are performed by digital logic, delay lines, microcontrollers, microprocessors, digital signal processors, and/or the like, instead of or in conjunction with analog circuitry. These and other variations are within the spirit and scope of the invention.

Figure 3:
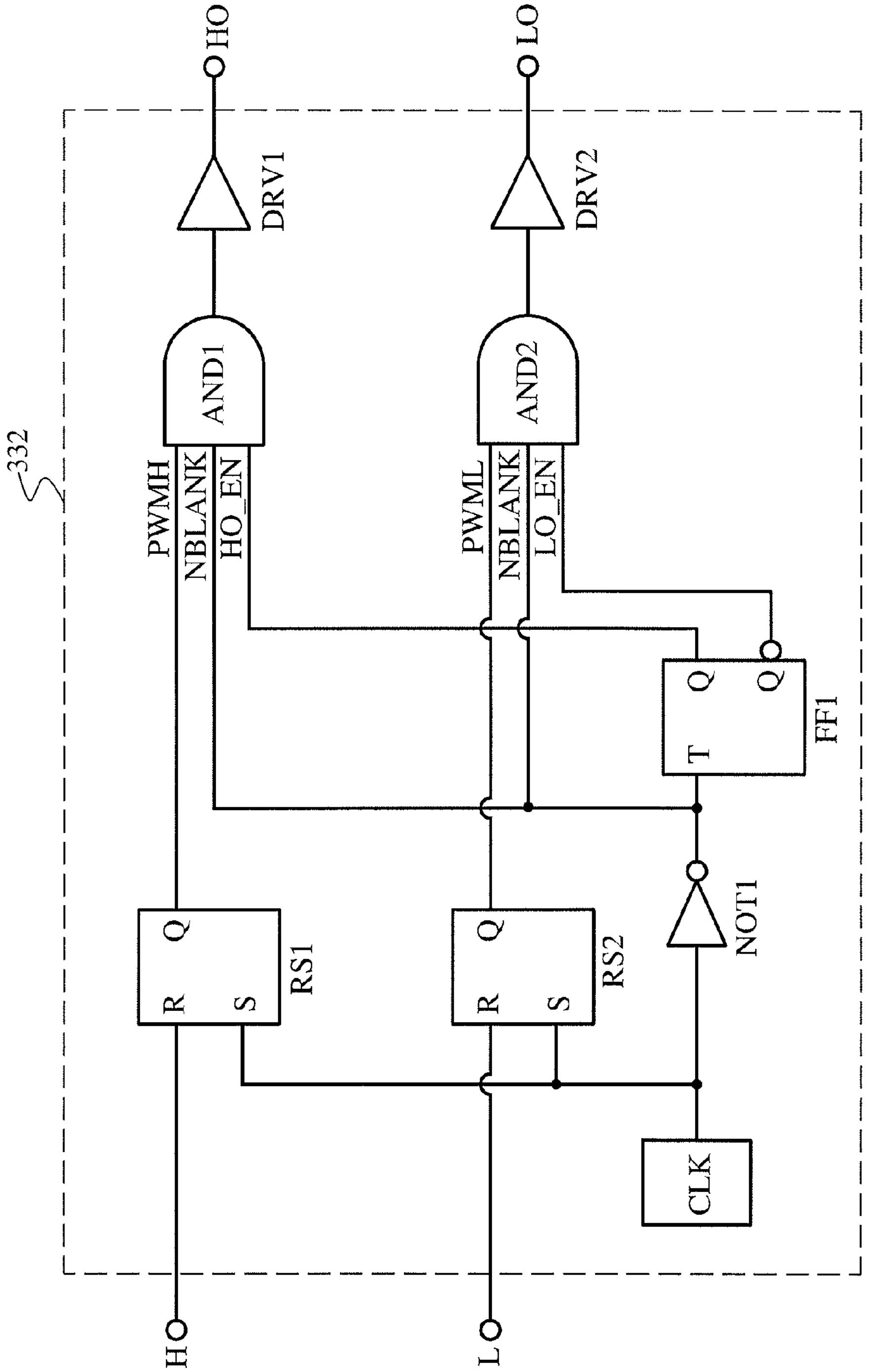
FIG. 3 is a schematic diagram of an embodiment of a pulse logic circuit of FIG. 2 according to aspects of the present invention.
Figures 4A, 4B, 4C, 4D, 4E, 4F, 4G, 4H, 4I, 4J:
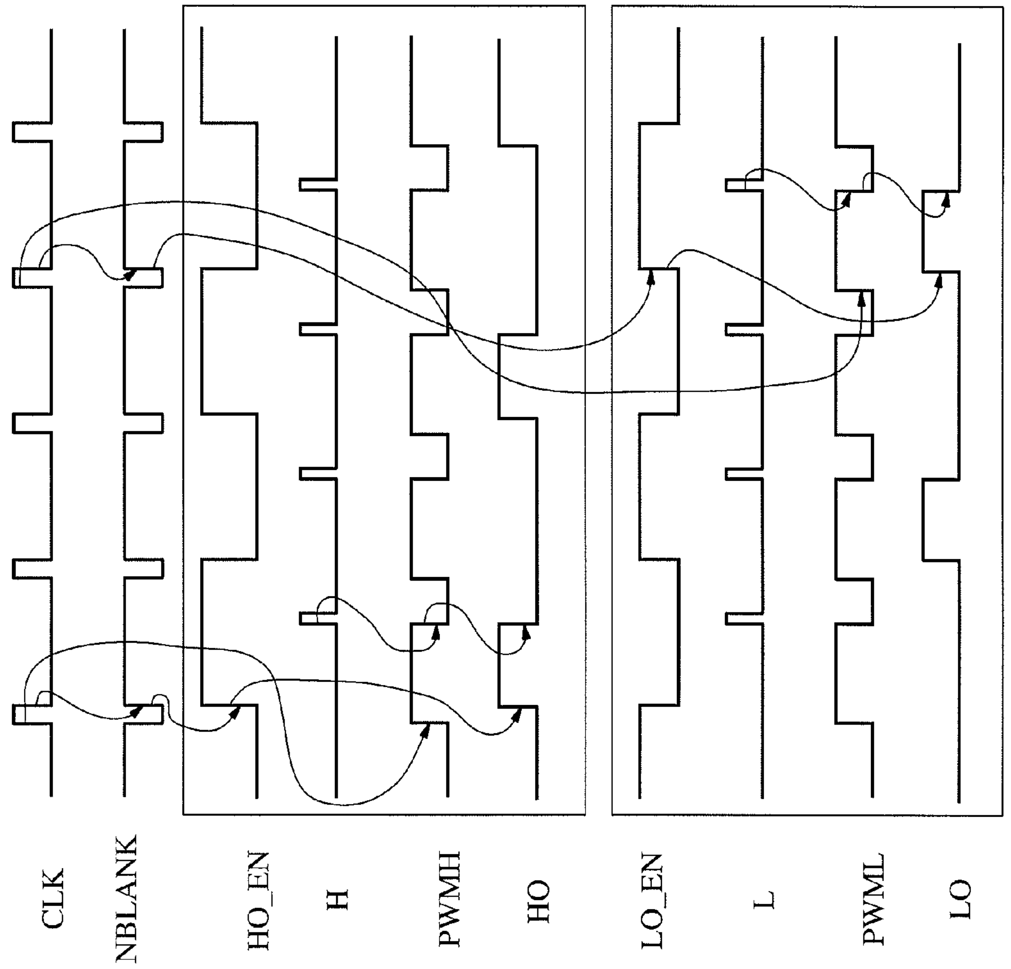
FIGS. 4A-4J are timing diagrams illustrating waveforms of embodiments of signals for an embodiment of the pulse logic circuit of FIG. 3.

FIG. 3 is a schematic diagram of an embodiment of pulse logic circuit 332. Pulse logic circuit 332 may be employed as an embodiment of pulse logic circuit 232 of FIG. 2. Pulse logic circuit 332 includes latches RS1 and RS2, flip-flop FF1, inverter NOT1, and gates AND1 and AND2, drivers DRV1 and DRV2, and clock source CLK. In one embodiment, pulse logic circuit 332 is arranged as a PWM logic circuit. However, PFM logic circuits, other PWM logic circuits, and/or the like may also be suitably employed.

FIGS. 4A-4J are timing diagrams illustrating waveforms of embodiments of signals for an embodiment of the pulse logic circuit of FIG. 3. FIGS. 4A-4J illustrate clock signal CLK, blanking signal NBLANK, high-output enable signal HO_en, high comparison signal H, high-latched signal PWMH, switch control signal HO, low-output enable signal LO_en, low comparison signal L, low-latched signal PWML, and switch control signal LO, respectively. Other embodiments of pulse logic circuit may operate differently without departing from the spirit and scope of the invention. FIGS. 4A-4J are not necessarily drawn to scale.

Figure 5:
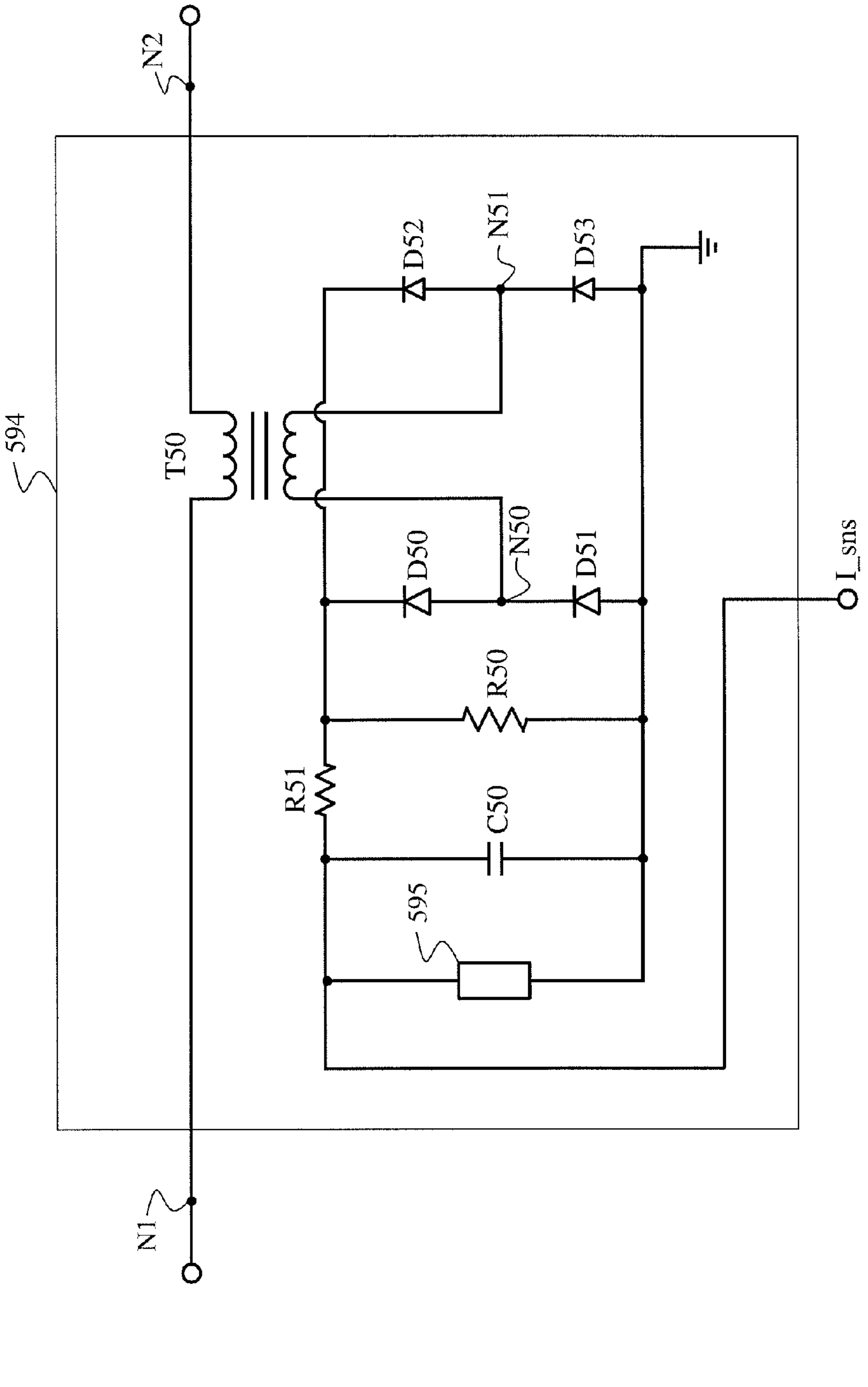
FIG. 5 is a schematic diagram of an embodiment of a current sense circuit of FIG. 2 according to aspects of the present invention.

FIG. 5 is a schematic diagram of an embodiment of current sense circuit 594. Current sense circuit 594 may be employed as an embodiment of current sense circuit 194 of FIG. 1. Current sense circuit 594 includes sense transformer T50, sense rectification diodes D50-53, sense resistor R50, filter resistor R51, filter capacitor C50, and shunt device 595.

In one embodiment, sense transformer T50 is arranged to provide a low impendence path between nodes N1 and N2 and to provide current to nodes N50 and N51 based, at least in part, on the current between nodes N1 and N2. In one embodiment, sense rectification diodes D50-53 are arranged to rectify the output of the secondary coil of transformer T1. Also, filter resistor R51 and filter capacitor C50 are arranged to provide a filtered current sense signal I_sns based on the voltage across sense resistor R50. In one embodiment, shunt device 595 is arranged to selectively discharge filter capacitor C50 between switching cycles. In one embodiment, an N-channel MOSFET switching device may be employed as shunt device 595. Other switching devices, such as those discussed above, may also be suitably employed. A clock signal, such as from clock source CLK of pulse logic circuit 332 of FIG. 3, may be employed to control shunt device 595.

Figure 6:
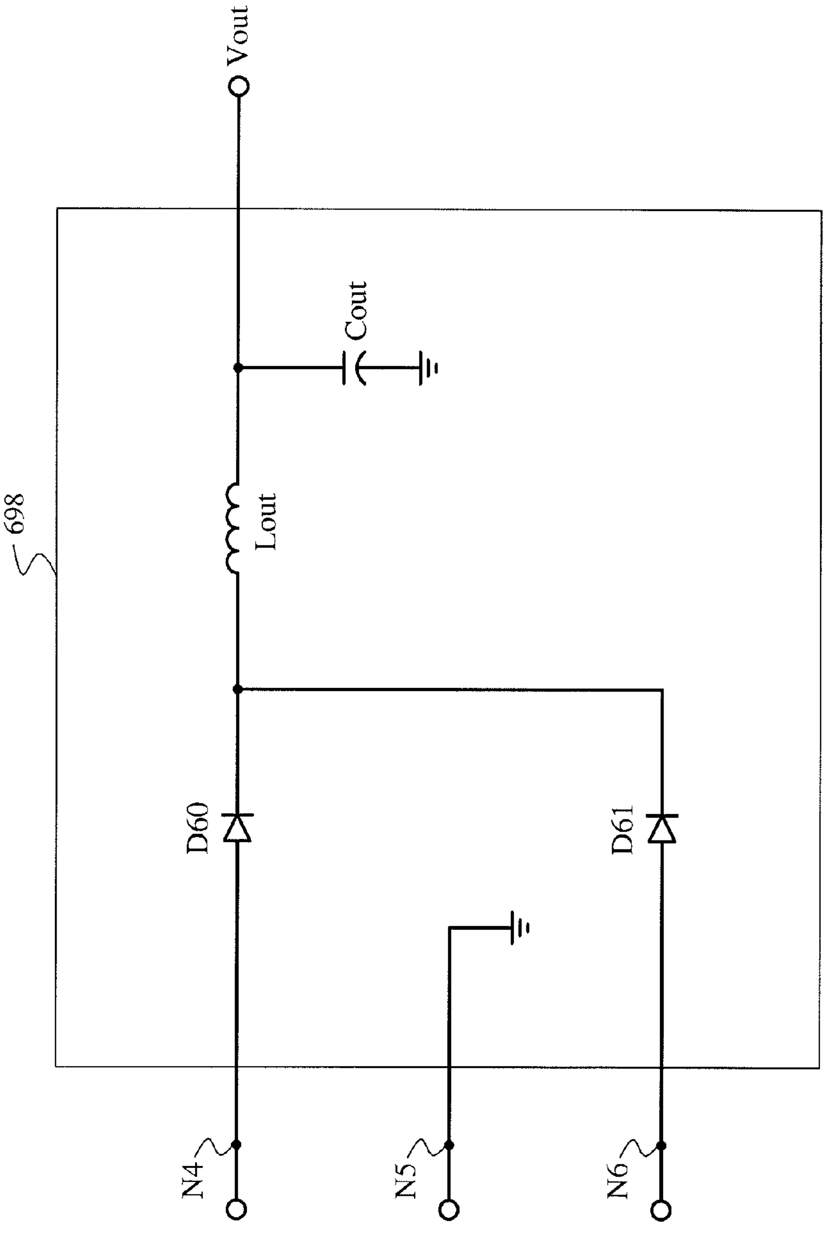
FIG. 6 is a schematic diagram of an embodiment of a rectification circuit of FIG. 2 according to aspects of the present invention.

FIG. 6 is a schematic diagram of an embodiment of rectification circuit 698. Rectification circuit 698 may be employed as an embodiment of rectification circuit 198 of FIG. 1.

Rectification circuit 698 includes rectification diodes D60 and D61, output inductor Lout, and output capacitor Cout. Rectification diodes D60 and D61, output inductor Lout, and output capacitor Cout may be of any suitable type or value. In other embodiments, rectification circuit 698 may perform synchronous rectification. In one embodiment, N-channel MOSFET switching devices may be employed as synchronous rectification switches. Other switching devices, such as those discussed above, may also be suitably employed.

Figure 7:
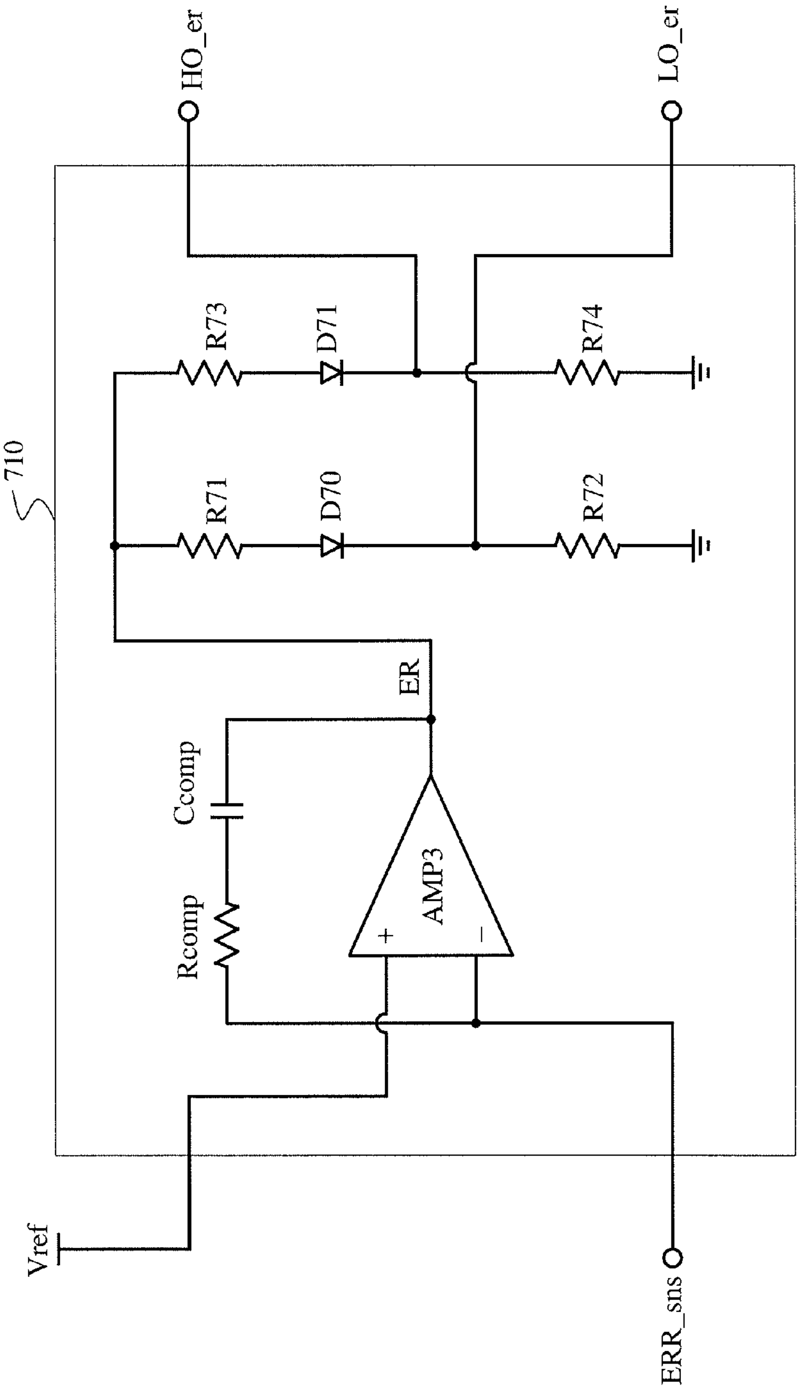
FIG. 7 is a schematic diagram of another embodiment of an error circuit of FIG. 1 according to aspects of the present invention.

FIG. 7 is a schematic diagram of an embodiment of error circuit 710. Error circuit 710 may be employed as another embodiment of error circuit 110 of FIG. 1. In one embodiment, error circuit 710 includes error amplifier AMP3. In this embodiment, R71-R74 and diodes D70 and D71 are arranged as a voltage divider and to block reverse current flow on error signals HO_er and LO_er. This circuitry, in effect, isolates error signal HO_er from stabilization signal LO_st and isolates error signal LO_er from stabilization signal HO_st. Other comparator circuits, differential amplifier circuits, operational amplifier circuits, differential-to-single-ended converter circuits, and/or the like, may also be suitable employed to provide error signals HO_er and LO_er. These and other error circuits are within the spirit and scope of the invention.

Figure 8:
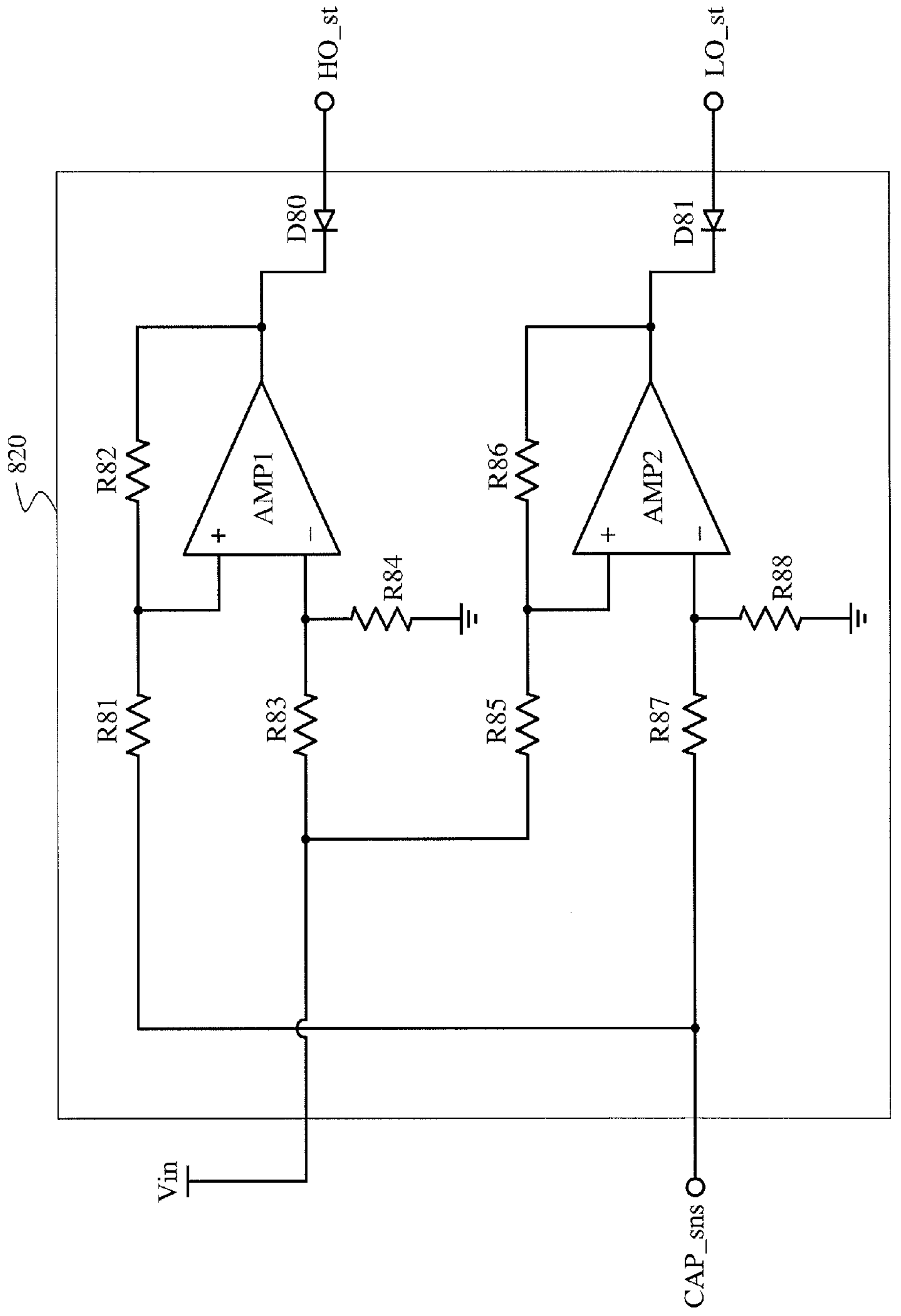
FIG. 8 is a schematic diagram of another embodiment of a stabilization circuit of FIG. 1 according to aspects of the present invention.

FIG. 8 is a schematic diagram of an embodiment of stabilization circuit 820. Stabilization circuit 820 may be employed as another embodiment of stabilization circuit 120 of FIG. 1. As illustrated, stabilization circuit 820 is a sink-only embodiment of a stabilization circuit. However, the invention is not limited in this fashion. For example, stabilization circuits may be sink-only, source-only, or sink-source. Also, other comparator circuits, differential amplifier circuits, operational amplifier circuits, differential-to-single-ended converter circuits, and/or the like, may also be suitable employed to provide stabilization signals HO_st and LO_st. These and other stabilization circuits are within the spirit and scope of the invention.

Figure 9:
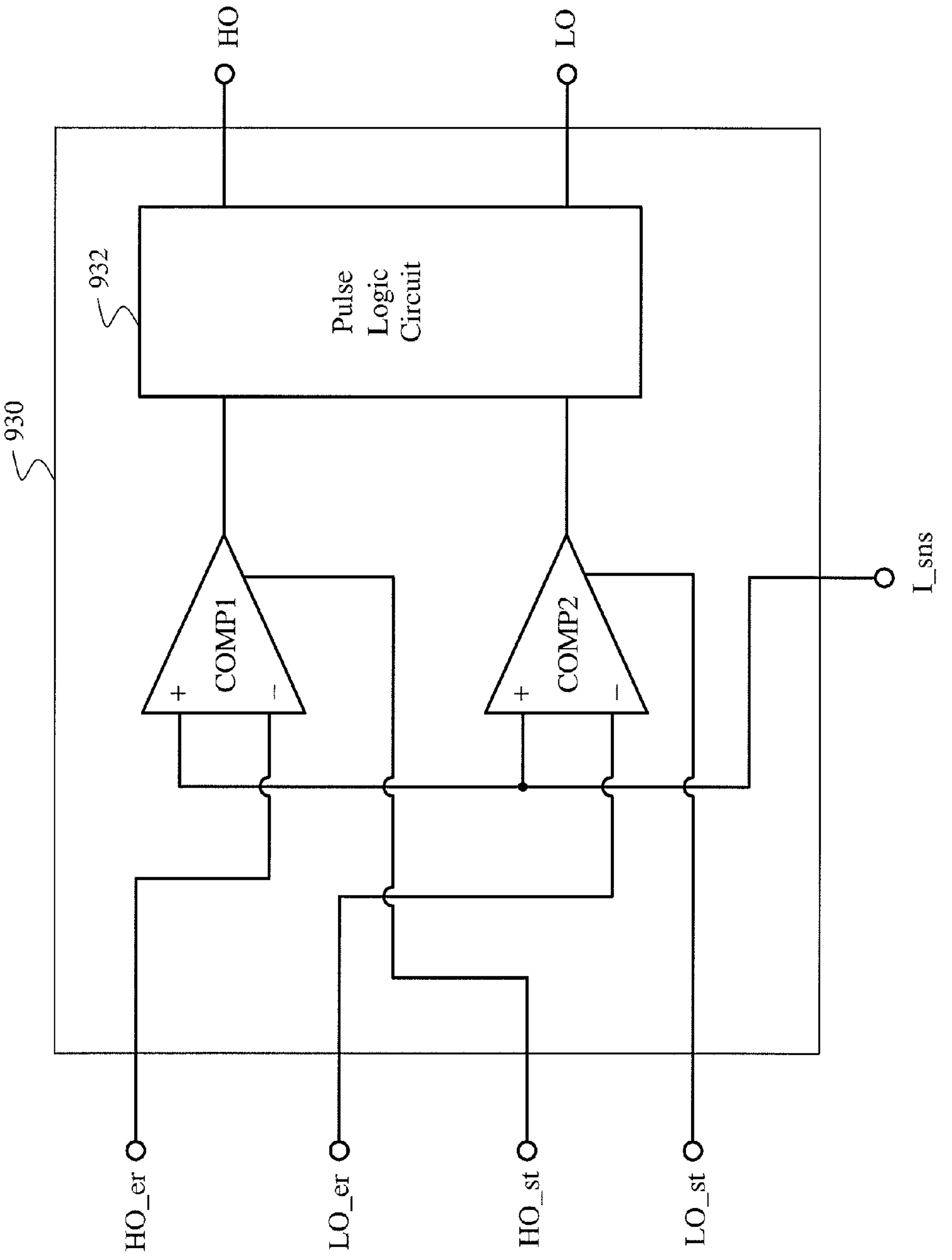
FIG. 9 is a schematic diagram of another embodiment of a pulse modulation circuit of FIG. 1 according to aspects of the present invention.

FIG. 9 is a schematic diagram of an embodiment of pulse modulation circuit 930. Pulse modulation circuit 930 may be employed as another embodiment of pulse modulation circuit 130 of FIG. 1.

Pulse modulation circuit 930 is arranged such that error signals HO_er and LO_er are provided to the respective inverting inputs of comparison circuits COMP1 and COMP2. Also, stabilization signals HO_st and LO_st are provided to comparison circuits COMP1 and COMP2, respectively, as compensation signals or offset signals. In other embodiments, other pulse modulation circuits may also be employed. For example, stabilization signals HO_st and LO_st may be provided to pulse modulation logic circuit to adjust the timing of switch control signal outputs; a stabilization circuit may be arranged to provide source-only stabilization signals to a pulse modulation circuit for summing with respective current sense signals; and/or the like.

The above specification, examples and data provide a description of the method and applications, and use of the invention. Since many embodiments of the invention can be made without departing from the spirit and scope of the invention, this specification merely sets forth some of the many possible embodiments for the invention.

What is claimed as new and desired to be protected by Letters Patent of the United States is:

1. A circuit for power conversion, comprising:

a current mode half-bridge power converter controller, including:

an error circuit that is arranged to receive an error sense signal and to provide a first error signal and a second error signal such that the first error and the second error signal are each based, at least in part, on the error sense signal;

a stabilization circuit that is arranged to receive a capacitor sense signal; to provide a first stabilization signal such that the first stabilization signal is substantially proportional to a difference between the capacitor sense signal and a first predetermined value at least while the difference is greater than a second predetermined value; and further arranged to provide a second stabilization signal such that the second stabilization signal is substantially proportional to the difference at least while the difference is less than a third predetermined value; and a pulse modulation circuit that is arranged to provide a first switch control signal that is based, at least in part, on the first error signal, the first stabilization signal, and a current sense signal; and further arranged to provide a second switch control signal that is based, at least in part, on the second error signal, the second stabilization signal, and the current sense signal.

2. The method of claim 1, wherein the current mode half-bridge power converter controller is arranged such that the capacitor sense signal is maintained at approximately one half of a half-bridge power converter input voltage.

3. The circuit of claim 1, wherein the pulse modulation circuit includes:

a first comparison circuit that is arranged to provide a first comparison signal based, at least in part, on a difference between a current sense signal and a sum of the first stabilization signal and the first error signal;

a second comparison circuit that is arranged to provide a second comparison signal based, at least in part, on a difference between the current sense signal and a sum of the second stabilization signal and the second error signal; and a pulse logic circuit that is arranged to provide the first switch control signal based, at least in part, on the first comparison signal, and to provide the second switch control signal based, at least in part, on the second comparison signal.

4. The circuit of claim 1, wherein the pulse modulation circuit includes:

a first PWM comparator having at least a non-inverting input that is arranged to receive a sum of the first error signal and the first stabilization signal, and an inverting input that is arranged to receive the current sense signal, wherein the first PWM comparator is arranged to provide a first comparison signal based on a difference between its non-inverting input and its inverting input; and a second PWM comparator having at least a non-inverting input that is arranged to receive a sum of the second error signal and the second stabilization signal, and an inverting input that is arranged to receive the current sense signal, wherein the second PWM comparator is arranged to provide a second comparison signal based on a difference between its non-inverting input and its inverting input.

5. The circuit of claim 1, wherein the stabilization circuit is arranged such that the first stabilization signal adjusts the first error signal and the second stabilization signal adjusts the second error signal.

6. The circuit of claim 1, wherein the stabilization circuit is arranged to adjust the comparison signal.

7. The circuit of claim 1, wherein the error circuit includes:

a circuit that is arranged to provide the first error signal and the second error signal such that the first error signal and the second error signal are each proportional to a difference between the error sense signal and a reference signal.

8. The circuit of claim 1, wherein the error circuit includes: an error amplifier.

9. The circuit of claim 1, wherein the stabilization circuit includes:

a first amplifier circuit having at least a non-inverting input that is arranged to receive the first predetermined voltage, and an inverting input that is arranged to receive the comparison signal, wherein the first amplifier circuit is arranged to provide the first stabilization signal such that the first stabilization signal is substantially proportional, with a negative constant of proportionality, to the difference while the difference is greater than the second predetermined value, wherein the second predetermined value is not negative; and a second amplifier circuit having at least an inverting input that is arranged to receive the first predetermined voltage, and a non-inverting input that is arranged to receive the comparison signal, wherein the second amplifier circuit is arranged to provide the second stabilization signal such that the second stabilization signal is substantially proportional, with a positive constant of proportionality, to the difference while the difference is less than the third predetermined value, wherein the third predetermined value is not positive.

10. The circuit of claim 9, wherein the second predetermined value and the third predetermined values are substantially equal to zero.

11. The circuit of claim 9, wherein the first amplifier circuit is arranged as a sink-only transconductance amplifier circuit, and wherein the second amplifier circuit is arranged as another sink-only transconductance amplifier circuit.

12. The circuit of claim 1, further comprising:

the input capacitor circuit, including:

a first capacitor that is coupled between a first supply voltage node and a mid-point node; and a second capacitor that is coupled between the mid-point node and a second supply voltage node, wherein the capacitor sense signal is based, at least in part, on a voltage at the mid-point node;

a transformer having at least a primary coil and a secondary coil, wherein a first input of the primary coil is arranged to be selectively coupled to the first supply voltage node, and to be selectively coupled to the second supply voltage node, and wherein a second input of the primary coil is coupled to the mid-point node;

a rectification circuit that is coupled to the secondary coil of the transformer, and that is arranged to rectify an output of the transformer; and a current sense circuit that is arranged to sense a switch circuit output current, and that is further arranged to provide the current sense signal that is based, at least in part, on a magnitude of the switch circuit output current.

13. The circuit of claim 12, wherein the second supply voltage node is ground.

14. A circuit for power conversion, comprising:

an error circuit that is arranged to provide a first error signal and a second error signal such that the first error and the second error signal are each based, at least in part, on the error sense signal;

a stabilization circuit that is arranged to operate in conjunction with an input capacitor circuit having at least two capacitors coupled in series; to provide a first stabilization signal and a second stabilization signals that are each based, at least in part, on a capacitor sense signal received from a mid-point of the input capacitor circuit; and further arranged to stabilize the capacitor sense signal; and a pulse modulation circuit that is arranged to provide a first switch control signal that is based, at least in part, on the first error signal, the first stabilization signal, and a current sense signal; and further arranged to provide a second switch control signal that is based, at least in part, on the second error signal, the second stabilization signal, and the current sense signal.

15. The circuit of claim 14, further comprising:

the input capacitor circuit, including:

a first capacitor that is coupled between a first supply voltage node and a mid-point node; and a second capacitor that is coupled between the mid-point node and a second supply voltage node; and a transformer having at least a primary coil and a secondary coil, wherein a first input of the primary coil is arranged to be selectively coupled to the first supply voltage node, and to be selectively coupled to the second supply voltage node, and wherein a second input of the primary coil is coupled to the mid-point node;

a switch circuit, including:

a first switch that is arranged to selectively couple the first supply voltage node to an output of the switch circuit while a first switch control signal is asserted; and a second switch that is arranged to selectively couple the second supply voltage node to the output of the switch circuit while a second switch control signal is asserted.

16. The circuit of claim 14, wherein the pulse modulation circuit includes:

a first comparison circuit that is arranged to provide the first switch control signal based, at least in part, on a difference between the current sense signal and a sum of the first stabilization signal and the first error signal; and a second comparison circuit that is arranged to provide the second switch control signal based, at least in part, on a difference between the current sense signal and a sum of the second stabilization signal and the second error signal.

17. The circuit of claim 14, wherein the stabilization circuit includes:

a first amplifier circuit having at least a non-inverting input that is arranged to receive a first predetermined voltage; and an inverting input that is arranged to receive a comparison signal, wherein the first amplifier circuit is arranged to provide the first stabilization signal based, at least in part, on a difference between first predetermined voltage and the comparison signal, wherein the comparison signal is based, at least in part, on the capacitor sense signal; and a second amplifier circuit having at least an inverting input that is arranged to receive the first predetermined voltage; and a non-inverting input that is arranged to receive the comparison signal, wherein the second amplifier circuit is arranged to provide the second stabilization signal based, at least in part, on a difference between the first predetermined voltage and the comparison signal.

18. A method of converting power, comprising:

providing a first error signal and a second error signal based, at least in part, on a difference between an output of a half-bridge power converter and a reference signal;

adjusting the first error signal based, at least in part, on a difference between a mid-point voltage associated with an input capacitor circuit of the half-bridge power converter and a mid-point voltage set-point;

adjusting the second error signal based, at least in part, on the difference between the mid-point voltage associated with the input capacitor circuit of the half-bridge power converter and the mid-point voltage set-point;

pulse modulating a first switch control signal based, at least in part, on a difference between the first adjusted error signal and a current sense signal;

pulse modulating a second switch control signal based, at least in part, on a difference between the second adjusted error signal and the current sense signal; and employing the first switch control signal and the second switch signal to perform power conversion.

19. The method of claim 18, wherein the adjusting the first error signal and the second error signal is accomplished such that the mid-point voltage is maintained at approximately one half of a half-bridge power converter input voltage.

20. The method of claim 18, wherein adjusting the first error signal includes:

sinking a portion of the first error signal; and wherein adjusting the second error signal includes:

sinking a portion of the second error signal.

* * * * *